US012681356B2

(12) United States Patent
Cheng et al.

(10) Patent No.: US 12,681,356 B2
(45) Date of Patent: Jul. 14, 2026

(54) DISPLAY DEVICE

(71) Applicant: E Ink Holdings Inc., Hsinchu (TW)

(72) Inventors: Wei-Sung Cheng, Hsinchu (TW);
Ming-Huan Yang, Hsinchu (TW);
Chen Chu Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 305 days.

(21) Appl. No.: 18/427,827

(22) Filed: Jan. 31, 2024

(65) Prior Publication Data

US 2024/0288741 A1     Aug. 29, 2024

(30) Foreign Application Priority Data

Feb. 24, 2023     (TW) ................................. 112106951

(51) Int. Cl.
G02F 1/16753          (2019.01)
G02F 1/167          (2019.01)

(52) U.S. Cl.
CPC .......... G02F 1/16753 (2019.01); G02F 1/167 (2013.01)

(58) Field of Classification Search
CPC .............. G02F 1/1345; G02F 1/13452; G02F 1/13458; G02F 1/16753; G09G 2380/02; G06F 1/1652; H05K 3/361; H05K 1/189; H05K 1/028; H01L 51/0097
See application file for complete search history.

(56) References Cited

U.S. PATENT DOCUMENTS

| | | | |
|---|---|---|---|
| 11,393,891 | B2 | 7/2022 | Oh et al. |
| 2014/0049983 | A1 | 2/2014 | Nichol et al. |

| | | | | |
|---|---|---|---|---|
| 2016/0334560 | A1 | 11/2016 | You et al. | |
| 2017/0323779 | A1* | 11/2017 | Um ................... | G02F 1/133305 |
| 2017/0352834 | A1* | 12/2017 | Kim ................. | G02F 1/133305 |
| 2018/0052274 | A1 | 2/2018 | Nichol et al. | |
| 2018/0123060 | A1* | 5/2018 | Jang .................... | H10D 86/411 |

(Continued)

FOREIGN PATENT DOCUMENTS

| | | |
|---|---|---|
| TW | 202028836 | 8/2020 |
| TW | 202215397 | 4/2022 |
| TW | 202227891 | 7/2022 |

OTHER PUBLICATIONS

"Office Action of Taiwan Counterpart Application", issued on Jul. 29, 2024, p. 1-p. 3.

*Primary Examiner* — Jonathan Y Jung

(74) *Attorney, Agent, or Firm* — JCIPRNET

(57)          ABSTRACT

A display device includes a driving substrate, a display medium layer, a conductive material, a protection assembly and a conductive terminal. The driving substrate includes a first portion, a second portion and a bent portion connecting the first portion and the second portion. The display medium layer is disposed on the first portion of the driving substrate. The conductive material is disposed on the second portion of the driving substrate. The protection assembly is disposed on the first portion of the driving substrate and located on the display medium layer. The protection assembly includes a film and a transparent conductive layer. The transparent conductive layer is disposed on the film and faces the display medium layer. The conductive terminal is connected to the protection assembly, and electrically connected to the transparent conductive layer and the conductive material.

9 Claims, 6 Drawing Sheets

(56) References Cited

U.S. PATENT DOCUMENTS

| | | | |
|---|---|---|---|
| 2018/0373091 | A1 | 12/2018 | Nagata et al. |
| 2019/0050086 | A1 | 2/2019 | Chang et al. |
| 2020/0258971 | A1 | 8/2020 | Oh et al. |
| 2021/0200384 | A1 | 7/2021 | Chang et al. |
| 2021/0216107 | A1 | 7/2021 | Lee |
| 2021/0280826 | A1 | 9/2021 | Kim et al. |
| 2022/0342461 | A1 | 10/2022 | Jeon et al. |
| 2022/0350213 | A1* | 11/2022 | Okazaki .............. G02F 1/13452 |

* cited by examiner

DISPLAY DEVICE

CROSS-REFERENCE TO RELATED APPLICATION

This application claims the priority benefit of Taiwan application serial no. 112106951, filed on Feb. 24, 2023. The entirety of the above-mentioned patent application is hereby incorporated by reference herein and made a part of this specification.

BACKGROUND

Technical Field

The disclosure relates to an optoelectronic device, and more particularly relates to a display device.

Description of Related Art

Among the packaging technologies used in the present panel-driven integrated circuits (ICs), Chip On Plastic (COP) technology is currently the smallest and narrowest border design for all panels. COP technology is to directly bond the integrated circuit to a flexible panel with a plastic substrate, and to make use of the bendable characteristics of the plastic substrate to achieve narrow/borderless frames. However, there is a silver glue dot on the frame of the integrated circuit of the electronic paper module, which is mainly used to electrically connect the upper electrode and the lower substrate, so as to control the electric field voltage difference when the panel is driven, and then make the panel display present images. However, the material of the silver glue dot cannot be bent, and its size and influence on the corresponding circuit design directly limit the efficiency of the electronic paper module to utilize the COP technology to improve the frame width of the integrated circuit.

SUMMARY

The disclosure provides a display device, which may reduce the frame width to meet the design requirements of narrow frames.

The display device of the disclosure includes a driving substrate, a display medium layer, a conductive material, a protection assembly and a conductive terminal. The driving substrate includes a first portion, a second portion and a bent portion connecting the first portion and the second portion. The display medium layer is disposed on the first portion of the driving substrate. The conductive material is disposed on the second portion of the driving substrate. The protection assembly is disposed on the first portion of the driving substrate and located on the display medium layer. The protection assembly includes a film and a transparent conductive layer. The transparent conductive layer is disposed on the film and faces the display medium layer. The conductive terminal is connected to the protection assembly, and is electrically connected to the transparent conductive layer and the conductive material.

In an embodiment of the disclosure, the above-mentioned display device further includes a support plate having a first surface and a second surface opposite to each other and a side surface connecting the first surface and the second surface. The first portion of the driving substrate, the display medium layer and the protection assembly are located on the first surface. The second portion of the driving substrate and the conductive material are located on the second surface. The bent portion of the driving substrate is located beside the side surface.

In an embodiment of the disclosure, the above-mentioned display device further includes a first adhesive layer and a second adhesive layer. The first adhesive layer is disposed between the first surface of the support plate and the first portion of the driving substrate. The first portion of the driving substrate is fixed on the first surface of the support plate through the first adhesive layer. The second adhesive layer is disposed between the second surface of the support plate and the second portion of the driving substrate. The second portion of the driving substrate is fixed on the second surface of the support plate through the second adhesive layer.

In an embodiment of the disclosure, the above-mentioned display device further includes a protective layer, which is directly disposed on the bent portion and the second portion of the driving substrate, and extends to the first portion of the driving substrate to seal a sidewall of the display medium layer.

In an embodiment of the disclosure, the above-mentioned protection assembly and the conductive terminal are integrally formed and have the same structure. The conductive terminal is disposed on the bent portion and the second portion of the driving substrate, and the protective layer is located between the conductive terminal and the driving substrate.

In an embodiment of the disclosure, the above-mentioned conductive terminal includes a plurality of hollows exposing the protective layer at the bent portion, and there is an air gap between the conductive terminal and the protective layer.

In an embodiment of the disclosure, the above-mentioned display device further includes a stress release layer disposed on the conductive terminal located at the bent portion of the driving substrate. The stress release layer is located between the conductive terminal and the protective layer, and there is an air gap between the stress release layer and the protective layer.

In an embodiment of the disclosure, the above-mentioned conductive terminal is disposed on the bent portion and the second portion of the driving substrate, and partially extends to a region between the protective layer and the transparent conductive layer of the protection assembly. The protective layer directly contacts the conductive terminal and the driving substrate, and is located between the conductive terminal and the driving substrate.

In an embodiment of the disclosure, the film of the above-mentioned protection assembly has a conductive hole electrically connected to the transparent conductive layer. The conductive terminal directly connects the conductive hole and the conductive material.

In an embodiment of the disclosure, the above display device further includes a flexible circuit board and a cover plate. The flexible circuit board is disposed on the second portion of the driving substrate. The cover plate is disposed on the film of the protection assembly.

Based on the above, in the display device of the disclosure, the conductive material is disposed on the second portion of the driving substrate, and the conductive terminal may be electrically connected to the transparent conductive layer of the protection assembly and the conductive material. That is to say, the conductive material of the disclosure is located on the second portion of the bent driving substrate relatively away from the display medium layer, thereby effectively reducing the width of the frame, so that the display device of the disclosure has an advantage of narrow frames, which meets the design requirements of narrow frames.

To make the aforementioned more comprehensible, several embodiments accompanied with drawings are described in detail as follows.

DESCRIPTION OF THE EMBODIMENTS

The embodiments of the disclosure may be understood together with the drawings, and the drawings of the disclosure are also regarded as a part of the disclosure. It should be understood that the drawings of the disclosure are not drawn to scale and, in fact, the dimensions of elements may be arbitrarily expanded or reduced in order to clearly represent the features of the disclosure.

Figure 1A:
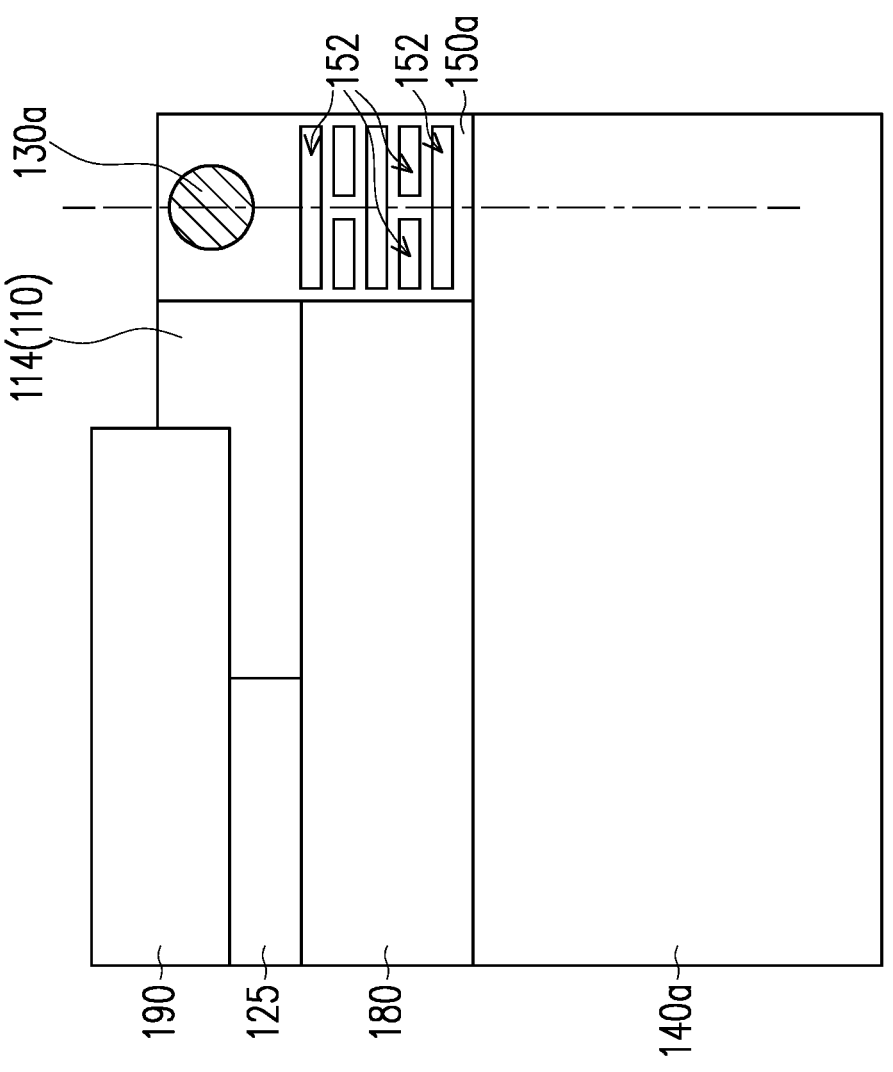
FIG. 1A is a schematic top view of a display device according to an embodiment of the disclosure.
Figure 1B:
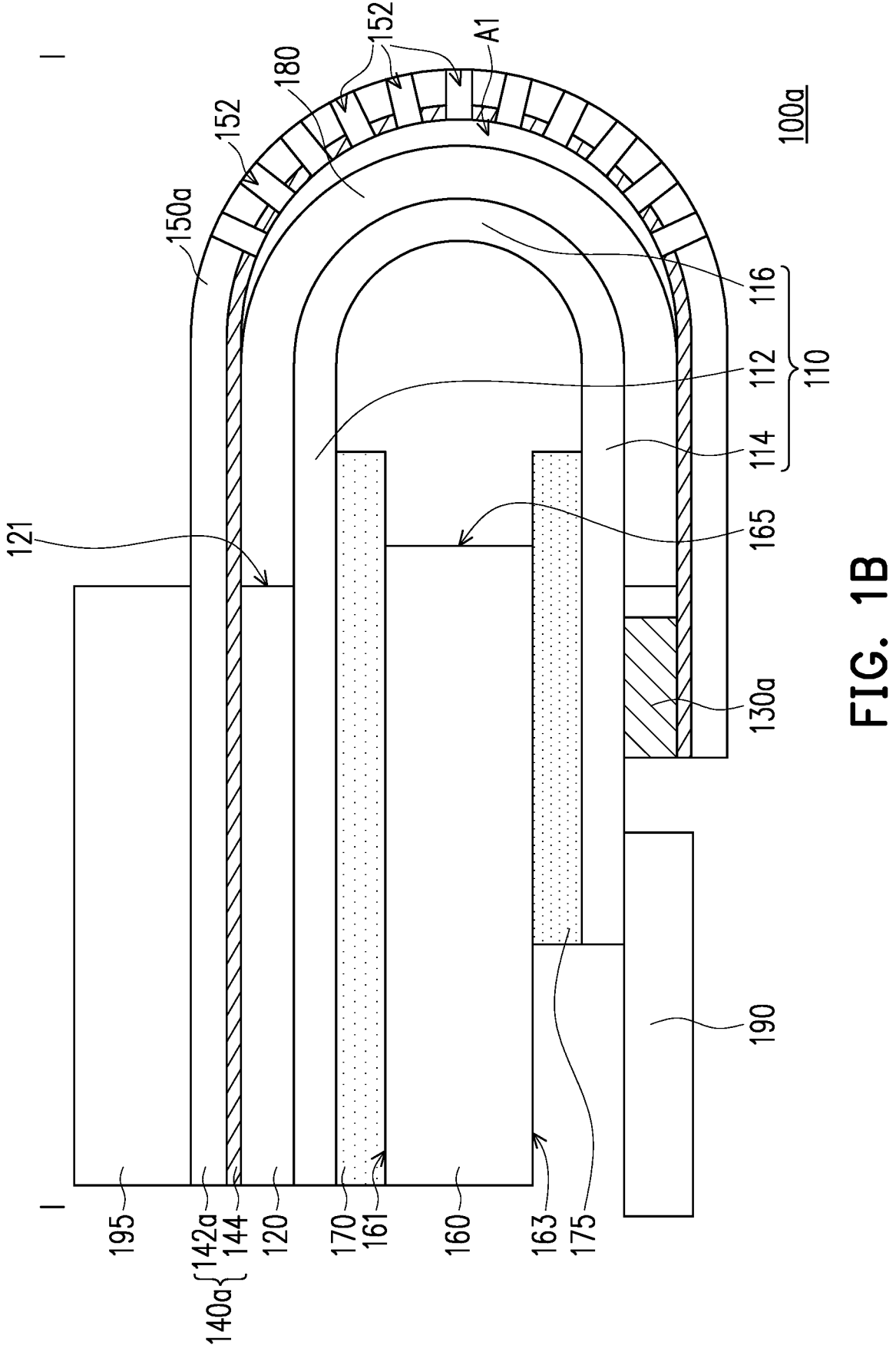
FIG. 1B is a schematic cross-sectional view along line I-I of FIG. 1A.

FIG. 1A is a schematic top view of the display device according to an embodiment of the disclosure. FIG. 1B is a schematic cross-sectional view along line I-I of FIG. 1A. It should be noted that, in FIG. 1A, the conductive terminal is not bent; however, in FIG. 1B, the conductive terminal is bent.

Please refer to FIG. 1A and FIG. 1B at the same time. In the embodiment, the display device 100a includes a driving substrate 110, a display medium layer 120, a conductive material 130a, a protection assembly 140a and a conductive terminal 150a. The driving substrate 110 includes a first portion 112, a second portion 114 and a bent portion 116 connecting the first portion 112 and the second portion 114. The display medium layer 120 is disposed on the first portion 112 of the driving substrate 110. The conductive material 130a is disposed on the second portion 114 of the driving substrate 110. The protection assembly 140a is disposed on the first portion 112 of the driving substrate 110 and located on the display medium layer 120. The protection assembly 140a includes a film 142a and a transparent conductive layer 144. The transparent conductive layer 144 is disposed on the film 142a and faces the display medium layer 120. The conductive terminal 150a is connected to the protection assembly 140a, and electrically connected to the transparent conductive layer 144 and the conductive material 130a.

In detail, in the present embodiment, the display device 100a is embodied as a reflective display device, such as an electrophoretic display device, but not limited thereto. The driving substrate 110 is, for example, an active device array substrate, such as a thin film transistor (TFT) array substrate or a thin film diode (TFD) array substrate, but not limited thereto. The display medium layer 120 is, for example, an electrophoretic display film or an electrowetting display film, but is not limited thereto. The conductive material 130 is, for example, silver glue dots, which may provide the voltage signal output from the driving substrate 110 to the transparent conductive layer 144 of the protection assembly 140a. That is to say, the driving chip 125 on the driving substrate 110 outputs a voltage signal, which is provided to the transparent conductive layer 144 located in the protection assembly 140a via the conductive terminals (not shown) and the conductive material 130 on the driving substrate 110. The above-mentioned conductive terminal, for instance, is a metal pad. In this way, the conductive material 130 is connected to the transparent conductive layer 144 so as to control the electric field voltage difference when the display device 100a is driven, so as to make the display device 100a present an image.

In particular, in the present embodiment, the protection assembly 140a and the conductive terminal 150a are integrally formed and have the same structure, which means that the protection assembly 140a and the conductive terminal 150a are made of the same material and have the same structural design. That is to say, the conductive terminal 150a of the present embodiment also includes the film 142a and the transparent conductive layer 144. The conductive terminal 150a is disposed on the bent portion 116 and the second portion 114 of the driving substrate 110. In particular, the conductive terminal 150a includes a plurality of hollows 152, and the hollows 152 penetrate the film 142a and the transparent conductive layer 144 of the conductive terminal 150a, which may effectively reduce the stress during bending, thereby reducing the interference effects of fan-out lines on the second portion 114 of the driving substrate 110 and the effects on the tensile stress of the transparent conductive layer 144.

Please refer to FIG. 1B again. In the present embodiment, the display device 100a further includes a support plate 160 having a first surface 161 and a second surface 163 opposite to each other and a side surface 165 connecting the first surface 161 and the second surface 163. The first portion 112 of the driving substrate 110, the display medium layer 120 and the protection assembly 140a are located on the first surface 161. The second portion 112 of the driving substrate 110 and the conductive material 130a are located on the second surface 163. The bent portion 116 of the driving substrate 110 and the conductive terminal 150a are located beside the side surface 165. Moreover, the display device 100a of the present embodiment further includes a first adhesive layer 170 and a second adhesive layer 175. The first adhesive layer 170 is disposed between the first surface 161 of the support plate 160 and the first portion 112 of the driving substrate 110. The first portion 112 of the driving substrate 110 is fixed on the first surface 161 of the support plate 160 through the first adhesive layer 170. The second adhesive layer 175 is disposed between the second surface 163 of the support plate 160 and the second portion 114 of the driving substrate 110. The second portion 114 of the driving substrate 110 is fixed on the second surface 163 of the support plate 160 through the second adhesive layer 175.

In addition, the display device 100a of the present embodiment further includes a protective layer 180, which is directly disposed on the bent portion 116 and the second portion 114 of the driving substrate 110, and extends to the first portion 112 of the driving substrate 110 to seal one sidewall 121 of the display medium layer 120. Furthermore, the protective layer 180 is located between the conductive terminal 150a and the driving substrate 110, and the hollows 152 of the conductive terminal 150a exposes the protective layer 180 located at the bent portion 116. Here, there is an air gap A1 between the conductive terminal 150a and the protective layer 180. In addition, the display device 100a of the embodiment further includes a flexible circuit board 190 and a cover plate 195. The flexible circuit board 190 is disposed on the second portion 114 of the driving substrate 110. The cover plate 195 is disposed on the film 142*a* of the protection assembly 140*a*.

In short, the conductive material 130*a* of the embodiment is disposed on the second portion 114 of the driving substrate 110, and the conductive terminal 150*a* may be electrically connected to the transparent conductive layer 144 of the protection assembly 140*a* and the conductive material 130*a*. That is to say, the conductive material 130*a* of the embodiment is located on the second portion 114 of the bent driving substrate 110 that is relatively far away from the display medium layer 120, thereby effectively reducing the width of the frame, so that the display device 100*a* has the advantage of narrow frames, which may meet the design requirements of narrow frames.

It should noted here that the following embodiments continue to adopt the reference numbers and part of the content of the previous embodiments, wherein the same numbers are used to represent the same or similar components, and the description of the same technical content is omitted. For the description of omitted parts, reference may be made to the foregoing embodiments, and the following embodiments will not be repeated.

Figure 2:
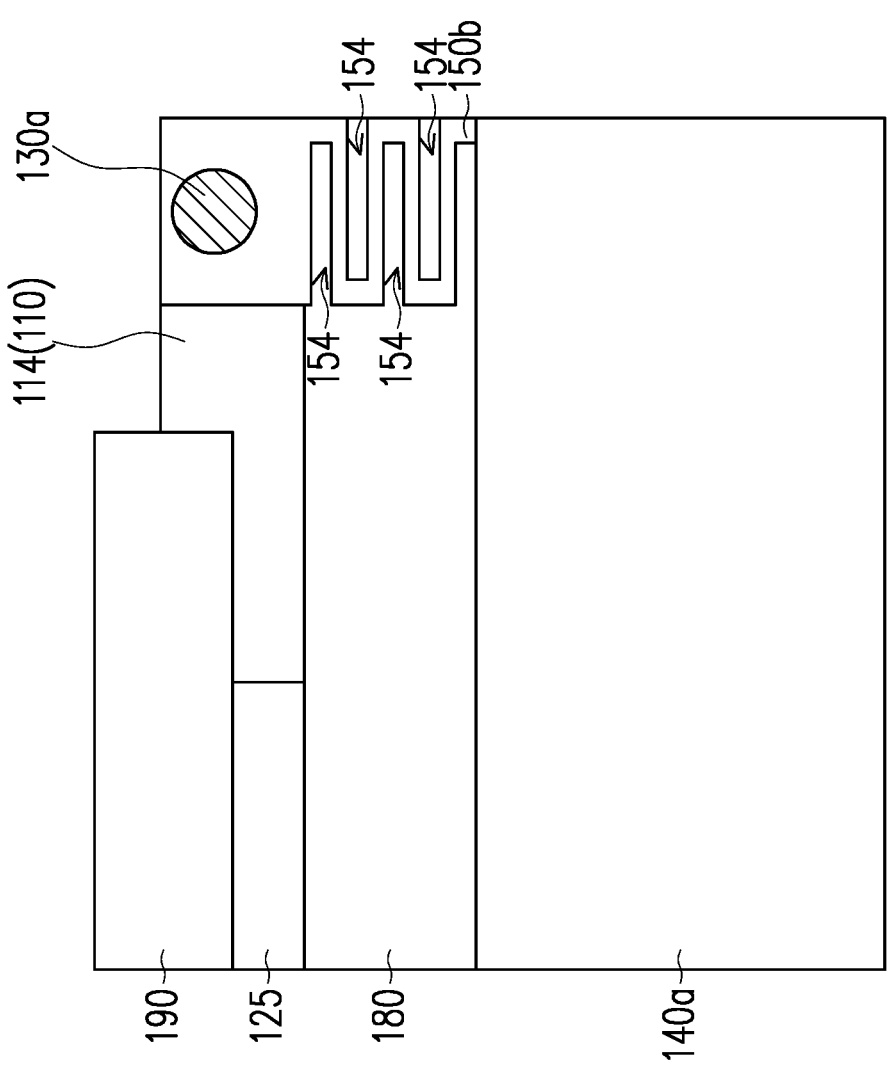
FIG. 2 is a schematic top view of a display device according to another embodiment of the disclosure.

FIG. 2 is a schematic top view of a display device according to another embodiment of the disclosure. Please refer to FIG. 1A and FIG. 2 at the same time. The display device 100*b* of the embodiment is similar to the above-mentioned display device 100*a*, and the difference between the two embodiments lies in that the conductive terminal 150*b* includes multiple hollows 154 and the arrangement of the hollows 154 makes the conductive terminal 150*b* present a meandering line, thereby reducing the influence of interference on the fan-out line on the second portion 114 of the driving substrate 110 and the influence on the tensile stress of the transparent conductive layer 144.

Figure 3:
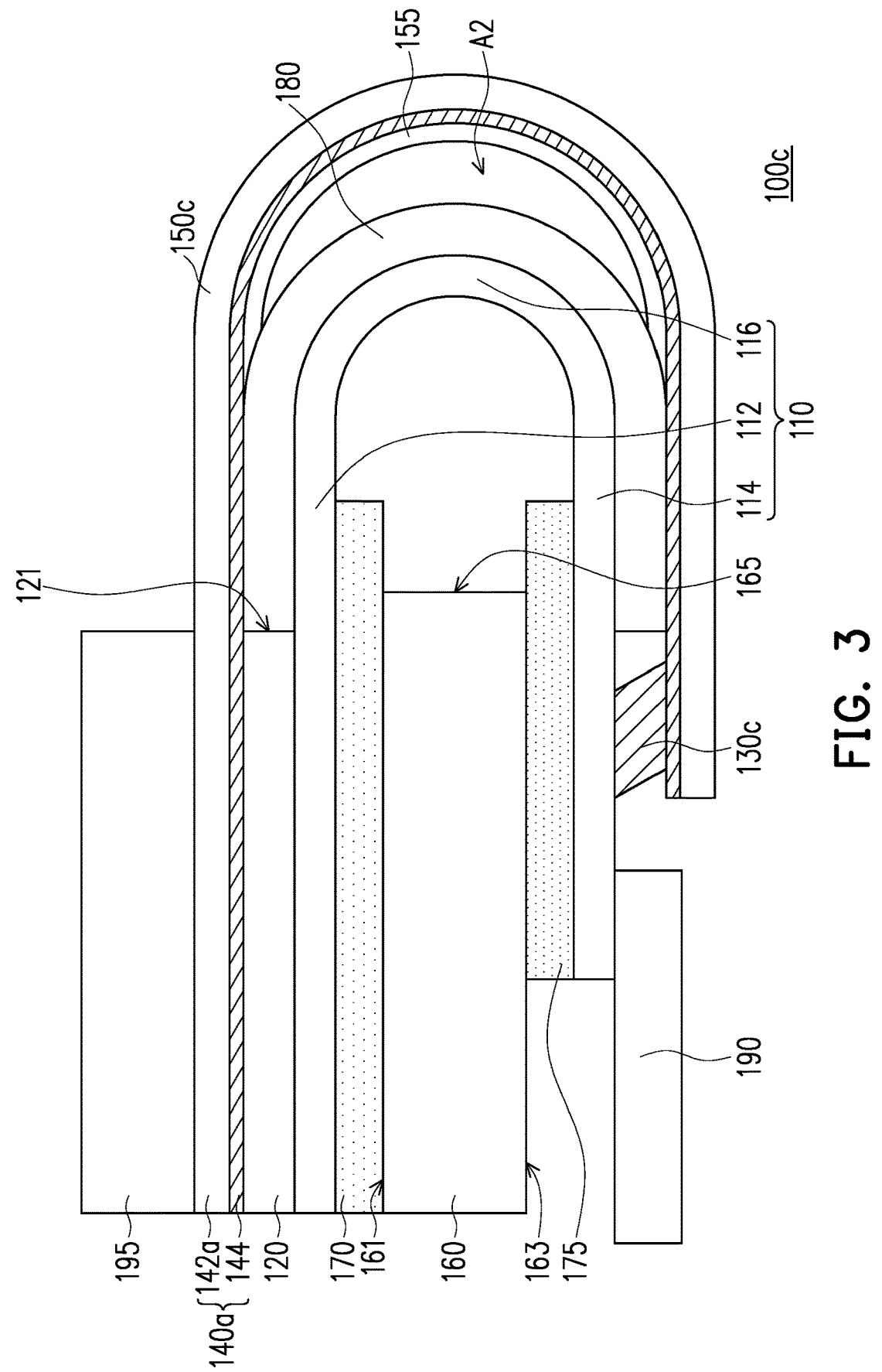
FIG. 3 is a schematic cross-sectional view of a display device according to another embodiment of the disclosure.

FIG. 3 is a schematic cross-sectional view of a display device according to another embodiment of the disclosure. Please refer to FIG. 1B and FIG. 3 at the same time. The display device 100*c* of the embodiment is similar to the above-mentioned display device 100*a*, the difference between two devices is that in the embodiment, the conductive terminal 150*c* is not provided with the above-mentioned hollows 152 and 154, but the display device 100*c* further includes a stress release layer 155 disposed on the conductive terminal 150*c* located on the bent portion 116 of the driving substrate 110. The stress release layer 155 is located between the conductive terminal 150*c* and the protective layer 180, and there is an air gap A2 between the stress release layer 155 and the protective layer 180. Here, the stress release layer 155 directly contacts the transparent conductive layer 144 of the conductive terminal 150*c*, thereby preventing the film 142*a* from breaking when it is bent, and reducing the possibility of straining the conductive terminal 150*c*. Here, the stress release layer 155 is, for example, directly formed by coating a stress release adhesive on the transparent conductive layer 144 of the conductive terminal 150*c*. In addition, the conductive material 130*c* of the embodiment is, for example, deformable silver glue dots, which may reduce the deformation and damage of the conductive terminal 150*c* due to bending.

Figure 4:
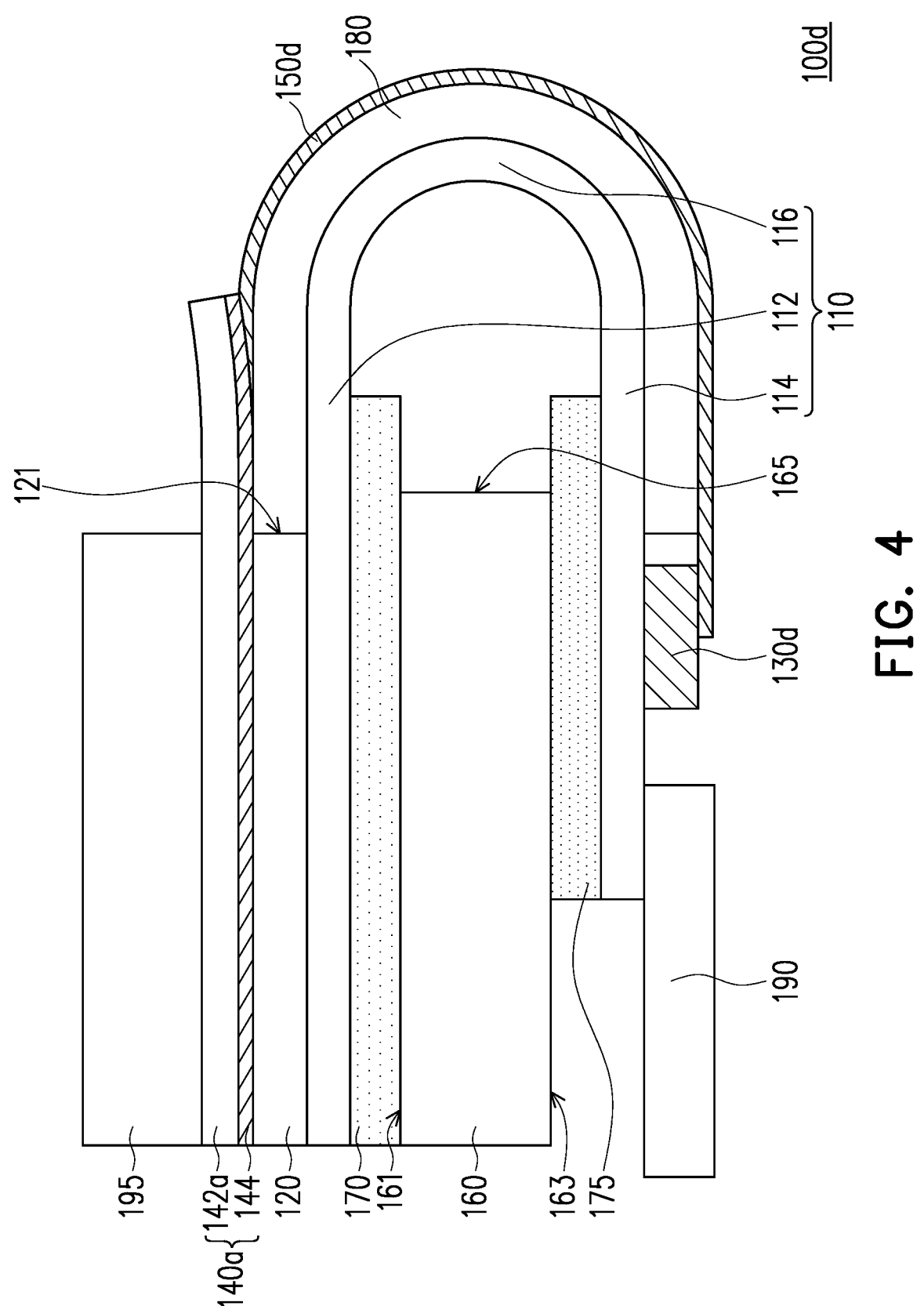
FIG. 4 is a schematic cross-sectional view of a display device according to another embodiment of the disclosure.

FIG. 4 is a schematic cross-sectional view of the display device according to another embodiment of the disclosure. Please refer to FIG. 1B and FIG. 4 at the same time. The display device 100*d* of the embodiment is similar to the above-mentioned display device 100*a*. The difference between the two is that in the embodiment, the protection assembly 140*a* and the conductive terminal 150*d* are independent components. The conductive terminal 150*d* is disposed on the bent portion 116 and the second portion 114 of the driving substrate 110, and partially extends between the protective layer 180 and the transparent conductive layer 144 of the protection assembly 140*a*. The conductive terminal 150*d* is directly connected to the transparent conductive layer 144 of the protection assembly 140*a* and the conductive material 130*d*. Here, the conductive terminal 150*d* is directly formed on the protective layer 180 by, for example, spraying, dispensing or smearing, and extends to the region between the protective layer 180 and the transparent conductive layer 144 of the protection assembly 140*a*. The protective layer 180 directly contacts the conductive terminal 150*d* and the driving substrate 110 and is located between the conductive terminal 150*d* and the driving substrate 110. At this time, there is no air gap between the conductive connecting member 150*d* and the protective layer 180.

Figure 5:
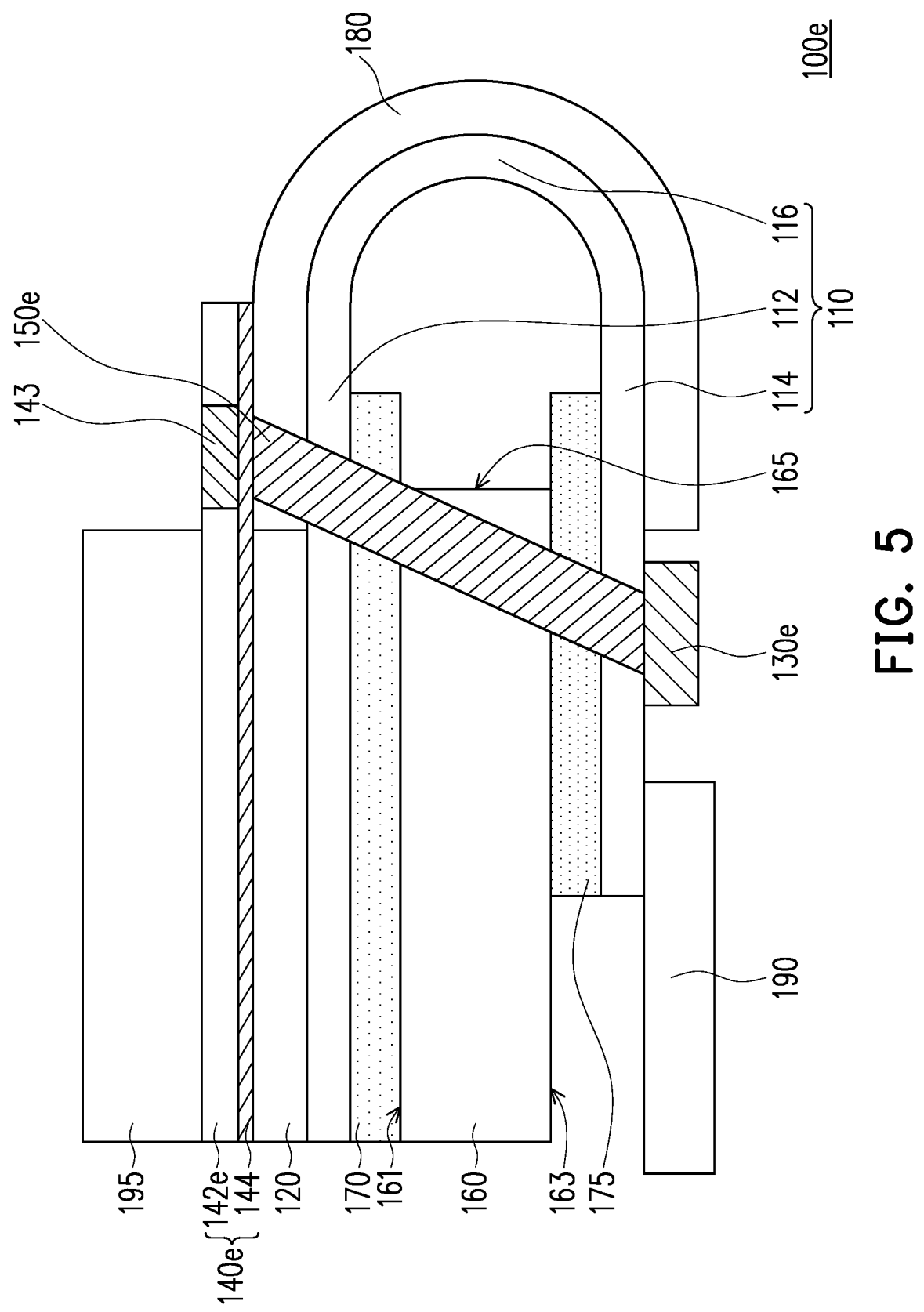
FIG. 5 is a schematic cross-sectional view of a display device according to another embodiment of the disclosure.

FIG. 5 is a schematic cross-sectional view of a display device according to another embodiment of the disclosure. Please refer to FIG. 1B and FIG. 5 at the same time. The display device 100*e* of the embodiment is similar to the above-mentioned display device 100*a*. The difference between the two devices lies in that in the embodiment, the film 142*e* of the protection assembly 140*e* have a conductive hole 143 electrically connected to the transparent conductive layer 144. After the driving substrate 110 is bent, the conductive connecting member 150*e* directly connects the conductive hole 143 and the conductive material 130*e* by sticking.

To sum up, in the display device of the disclosure, the conductive material is disposed on the second portion of the driving substrate, and the conductive terminal may electrically connect the transparent conductive layer of the protection assembly and the conductive material. That is to say, the conductive material of the disclosure is located on the second portion of the bent driving substrate relatively away from the display medium layer, thereby effectively reducing the width of the frame, so that the display device of the disclosure has an advantage of narrow frames, which meets the design requirements of narrow frames.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:
   a driving substrate, comprising a first portion, a second portion and a bent portion connecting the first portion and the second portion;
   a display medium layer disposed on the first portion of the driving substrate;
   a conductive material disposed on the second portion of the driving substrate;
   a protection assembly disposed on the first portion of the driving substrate and located on the display medium layer, and the protection assembly comprising a film and a transparent conductive layer disposed on the film and facing the display medium layer;
   a conductive terminal connected to the protection assembly and electrically connected to the transparent conductive layer and the conductive material; and a protective layer, which is directly disposed on the bent portion and the second portion of the driving substrate, and extends to the first portion of the driving substrate to seal a sidewall of the display medium layer.

2. The display device of claim 1, further comprising:

a support plate having a first surface and a second surface opposite to each other and a side surface connecting the first surface and the second surface, wherein the first portion of the driving substrate, the display medium layer and the protection assembly are located on the first surface, and the second portion of the driving substrate and the conductive material are located on the second surface, and the bent portion of the driving substrate is located next to the side surface.

3. The display device of claim 2, further comprising:

a first adhesive layer disposed between the first surface of the support plate and the first portion of the driving substrate, wherein the first portion of the driving substrate is fixed on the first surface of the support plate through the first adhesive layer; and a second adhesive layer disposed between the second surface of the support plate and the second portion of the driving substrate, wherein the second portion of the driving substrate is fixed on the second surface of the support plate through the second adhesive layer.

4. The display device of claim 1, wherein the protection assembly and the conductive terminal are integrally formed and have the same structure, and the conductive terminal is disposed on the bent portion and the second portion of the driving substrate, and the protective layer is located between the conductive terminal and the driving substrate.

5. The display device of claim 4, wherein the conductive terminal comprises a plurality of hollows, exposing the protective layer at the bent portion, and there is an air gap between the conductive terminal and the protective layer.

6. The display device of claim 4, further comprising:

a stress release layer disposed on the conductive terminal located at the bent portion of the driving substrate, wherein the stress release layer is located between the conductive terminal and the protective layer, and there is an air gap between the stress release layer and the protective layer.

7. The display device of claim 1, wherein the conductive terminal is disposed on the bent portion and the second portion of the driving substrate, and partially extends to a region between the protective layer and the transparent conductive layer of the protection assembly, and the protective layer directly contacts the conductive terminal and the driving substrate, and is located between the conductive terminal and the driving substrate.

8. The display device of claim 1, wherein the film of the protection assembly has a conductive hole electrically connected to the transparent conductive layer, and the conductive terminal directly connects the conductive hole and the conductive material.

9. The display device of claim 1, further comprising:

a flexible circuit board disposed on the second portion of the driving substrate; and a cover plate, which is disposed on the film of the protection assembly.

* * * * *